Aug. 23, 1932.  H. O. POLLEI  1,873,905

ELECTRIC WELDING OF PRESSURE VESSELS

Filed Oct. 23, 1929

INVENTOR.
Harold O. Pollei
BY
ATTORNEY.

Patented Aug. 23, 1932

1,873,905

UNITED STATES PATENT OFFICE

HAROLD O. POLLEI, OF MILWAUKEE, WISCONSIN, ASSIGNOR TO A. O. SMITH CORPORATION, OF MILWAUKEE, WISCONSIN, A CORPORATION OF NEW YORK

ELECTRIC WELDING OF PRESSURE VESSELS

Application filed October 23, 1929. Serial No. 401,707.

This invention relates to electric welding of pressure vessels.

The invention is particularly applicable to the welding of tubular connections to thick walled pressure vessels such as those disclosed in Reissue Patent No. 16,865, to L. R. Smith.

An object of the invention is to provide a novel method of welding a tubular connection to a flat or curved thick metal plate.

A more specific object of the invention is to provide a strong simple means of connecting a tubular member to a thick metal wall of a pressure vessel.

An embodiment of the invention is illustrated in the accompanying drawing in which the views are as follows.

The thick metal wall 1 of the vessel has a circular opening 2 for receiving the tubular connection or manway 3. The diameter of the opening 2 in the wall 1 is greater than the outside diameter of the manway 3. The manway 3 is inserted concentrically within said opening leaving a circumferential gap 4 between the wall 1 and the said manway.

Figure 1:
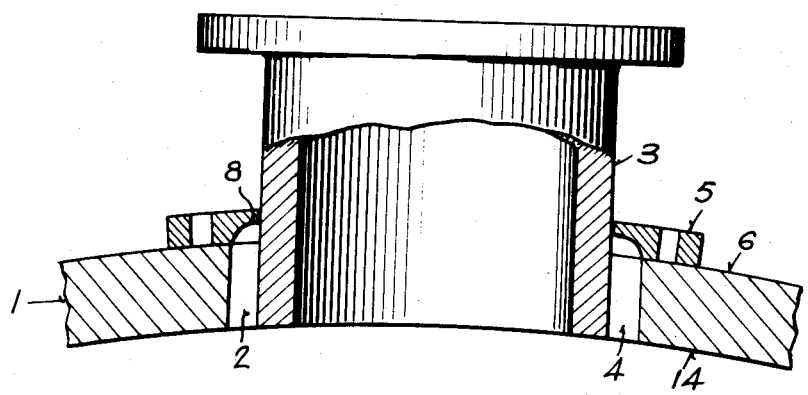
Figure 1 is a longitudinal section through a manway and the adjacent portion of the vessel showing parts prepared for the welding operation.
Figure 2:
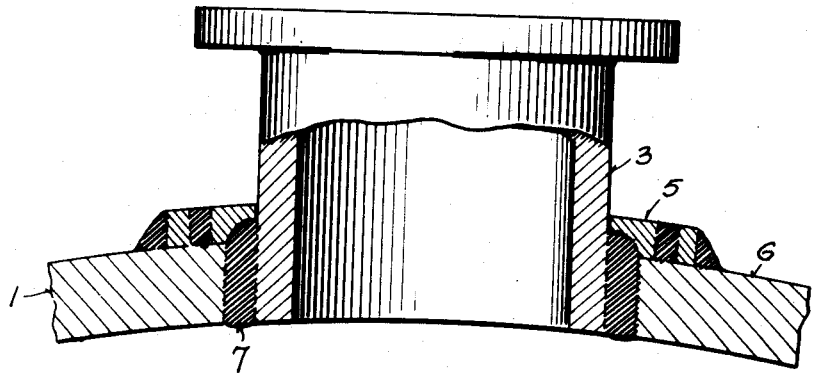
Fig. 2 is a similar view showing the parts welded together.
Figure 3:
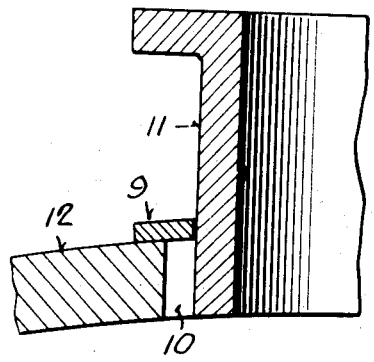
Fig. 3 is a detailed longitudinal section showing a modified application of the invention before welding.

A plate 5 is welded to the outer wall 6 of the vessel encircling and fitting tightly against the tubular connection. This plate reenforces the vessel wall 1 and closes the gap 4 between the manway 3 and the wall 1 of the vessel thereby serving as a dam for the welding metal 7. The depth of the gap is increased by chamfering the underside of the reenforcing plate on the edge 8 abutting the tubular connection 3, as shown in Figs. 1 and 2.

The gap is then filled with welding metal 7 uniting the tubular connection 3 to the wall 1 of the vessel.

Figure 4:
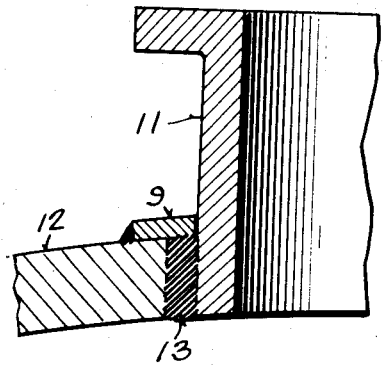
Fig. 4 is a similar view showing the parts of Fig. 3 welded together.

A thinner plate may be substituted for the reenforcing plate and the chamfering dispensed with, as illustrated in Fig. 4. The thin plate 9 forms a dam closing the gap 10 between the tubular connection 11 and the wall 12 of the vessel in which the weld metal 13 is deposited, the depth of the weld then being substantially equal to the thickness of the wall of the vessel. This plate may be cut away and replaced by a reenforcing plate where required.

The tubular connection 3 is preferably inserted substantially flush with the inner periphery 14 of the vessel. However, the tube may be inserted to any degree which is found desirable for a specific purpose.

Various modifications and embodiments of this invention may be employed in which a gap for depositing weld metal is formed by providing an opening in the wall of the pressure vessel of a greater diameter than the outside diameter of the tubular connection.

Having thus described the invention, what is claimed and desired to be secured by Letters Patent is:

1. The method of welding the end of a metal tube to a thick metal plate, which comprises providing an opening of a greater diameter in the thick metal plate than that of said tube to be joined thereto, inserting said tube to a position substantially flush with the inner wall of said thick plate and concentric with said opening leaving a gap between said metal tube and said thick wall, applying a relatively thin plate encircling said metal tube to close said gap at one end, and arc welding the metal tube to said thick metal plate and to said ring thereby filling the closed gap with fused welding metal.

2. The method of welding tubular connections having a uniform outside diameter throughout their length to thick walled pressure vessels, which comprises providing an opening of greater diameter in the thick metal wall of the vessel than that of said tube sought to be joined therein and having its sides forming a cylindrical surface, inserting said tube into said opening concentric with the cylindrical sides thereof and forming a gap of substantially uniform width between said tubular connection and said thick wall, and then arc welding the tubular connection to said vessel wall thereby filling the gap so formed with fused metal welding said metal tube to said vessel wall.

3. The method of welding the end of a metal tube to a thick walled pressure vessel which comprises forming a welding groove between said wall and said tube by forming an opening in the wall of the vessel which is greater in diameter than that of said tube, inserting said tube concentric with said opening and forming a gap between said thick wall and said tube, closing the gap so formed at its outside edge with a plate which encircles said tubular connection, and arc welding said tubular connection to said thick walled pressure vessel and said plate, thereby filling said gap with fusing welding metal from the inside of said pressure vessel.

In testimony whereof I have signed my name at Milwaukee, Wisconsin, this 17th day of October, 1929.

HAROLD O. POLLEI.